(12) United States Patent
Lee et al.

(10) Patent No.: US 7,446,985 B2
(45) Date of Patent: Nov. 4, 2008

(54) EPITAXIAL OXIDE CAP LAYERS FOR ENHANCING GMR PERFORMANCE

(75) Inventors: Wen-yaung Lee, San Jose, CA (US); Jinshan Li, San Jose, CA (US); Kebin Li, Singapore (SG); Yihong Wu, Singapore (SG)

(73) Assignees: Agency for Science Technology and Research, Singapore (SG); Hitachi Global Storage Technologies Netherlands B.V., Amsterdam (NL)

( * ) Notice: Subject to any disclaimer, the term of this patent is extended or adjusted under 35 U.S.C. 154(b) by 182 days.

(21) Appl. No.: 10/741,436

(22) Filed: Dec. 19, 2003

(65) Prior Publication Data

US 2005/0135004 A1 Jun. 23, 2005

(51) Int. Cl.
*G11B 5/127* (2006.01)
*G11B 5/39* (2006.01)

(52) U.S. Cl. .............................. 360/324.12; 428/811.2; 428/811.5; 428/814; 428/815; 428/816

(58) Field of Classification Search ....................... None
See application file for complete search history.

(56) References Cited

U.S. PATENT DOCUMENTS

| | | | | |
|---|---|---|---|---|
| 4,825,325 | A | 4/1989 | Howard | 360/113 |
| 5,064,477 | A * | 11/1991 | Delahoy | 136/256 |
| 5,462,795 | A | 10/1995 | Shinjo et al. | 428/332 |
| 5,756,207 | A * | 5/1998 | Clough et al. | 428/375 |
| 6,490,139 | B1 * | 12/2002 | Hayashi et al. | 360/322 |
| 6,495,275 | B2 * | 12/2002 | Kamiguchi et al. | 428/811.2 |
| 6,517,896 | B1 | 2/2003 | Horng et al. | 427/123 |
| 6,608,740 | B2 | 8/2003 | Tanaka et al. | 360/324.12 |
| 7,190,557 | B2 * | 3/2007 | Li et al. | 360/324.1 |
| 2001/0005300 | A1 | 6/2001 | Hayashi | 360/317 |
| 2001/0006444 | A1 | 7/2001 | Hayakawa et al. | 360/324.1 |
| 2002/0048127 | A1 | 4/2002 | Fukuzawa et al. | 360/324.1 |
| 2003/0030944 | A1 * | 2/2003 | Lin et al. | 360/324.1 |
| 2003/0035256 | A1 | 2/2003 | Hayashi et al. | 360/324.12 |
| 2003/0151859 | A1 | 8/2003 | Hayashi et al. | 360/324.2 |

FOREIGN PATENT DOCUMENTS

| | | |
|---|---|---|
| DE | 19652536 | 6/1997 |
| JP | 05-143934 A * | 6/1993 |
| JP | 10313138 | 11/1998 |
| JP | 2001222804 | 8/2001 |
| JP | 2003101100 | 4/2003 |

OTHER PUBLICATIONS

JPO Abstract Translation of JP 05-143934 A (Pat-No. JP405143934A).*
Machine Translation of JP 2001-222804 A.*
Full English Translation of JP 05-143934 A (PTO 07-4552).*
Full English Translation of JP 2001-222804 A (PTO 07-2984).*
Lin, Tsann et al., "Effects of Oxide Seed and Cap Layers on Magnetic Properties of a Synthetic Spin Valve", Applied Physics Letters, vol. 78, No. 15, Apr. 9, 2001.

* cited by examiner

*Primary Examiner*—Kevin M Bernatz
(74) *Attorney, Agent, or Firm*—Zilka-Kotab, PC

(57) ABSTRACT

A magnetic head and magnetic storage system containing such a head, the head including a free layer and a layer of metal oxide substantially epitaxially formed relative to the free layer. Preferably, the layer of metal oxide is a crystalline structure, and is of ZnO.

27 Claims, 8 Drawing Sheets

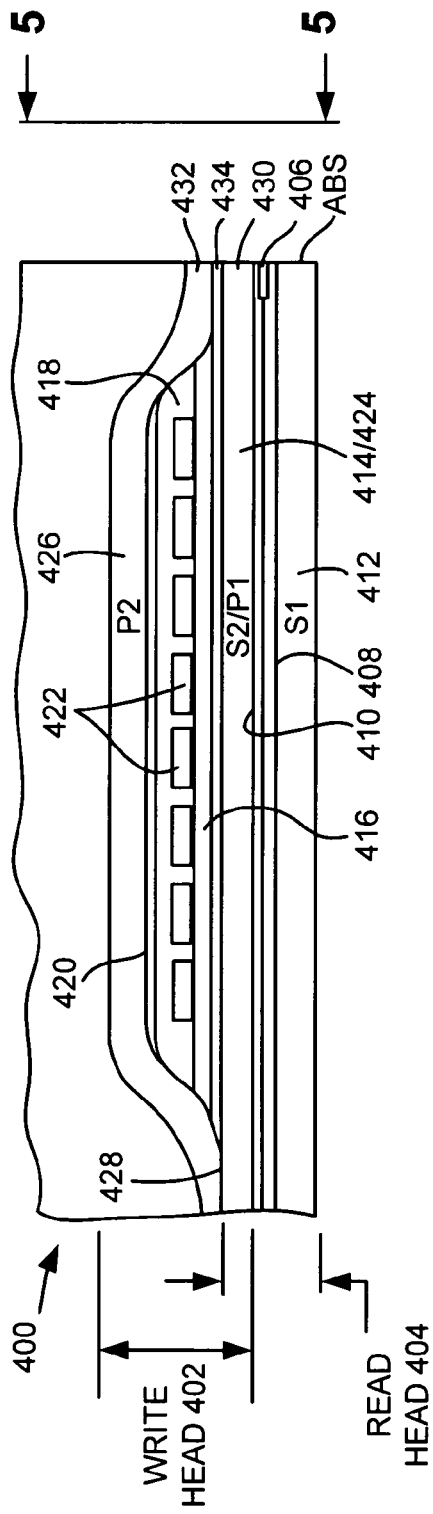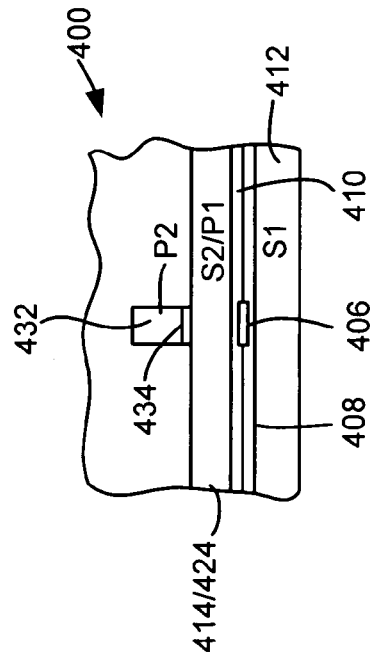
FIG. 4
FIG. 5

EPITAXIAL OXIDE CAP LAYERS FOR ENHANCING GMR PERFORMANCE

FIELD OF THE INVENTION

The present invention relates to magnetic head structures, and more particularly, this invention relates to novel head structures implementing a metal oxide layer for enhanced signal.

BACKGROUND OF THE INVENTION

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

In high capacity disk drives, magnetoresistive (MR) read sensors, commonly referred to as MR heads, are the prevailing read sensors because of their capability to read data from a surface of a disk at greater track and linear densities than thin film inductive heads. An MR sensor detects a magnetic field through the change in the resistance of its MR sensing layer (also referred to as an "MR element") as a function of the strength and direction of the magnetic flux being sensed by the MR layer.

The conventional MR sensor operates on the basis of the anisotropic magnetoresistive (AMR) effect in which an MR element resistance varies as the square of the cosine of the angle between the magnetization in the MR element and the direction of sense current flow through the MR element. Recorded data can be read from a magnetic medium because the external magnetic field from the recorded magnetic medium (the signal field) causes a change in the direction of magnetization of the MR element, which in turn causes a change in resistance of the MR element and a corresponding change in the sensed current or voltage.

Another type of MR sensor is the giant magnetoresistance (GMR) sensor manifesting the GMR effect. In GMR sensors, the resistance of the GMR sensor varies as a function of the spin-dependent transmission of the conduction electrons between ferromagnetic layers separated by a non-magnetic layer (spacer) and the accompanying spin-dependent scattering which takes place at the interface of the ferromagnetic and non-magnetic layers and within the ferromagnetic layers.

GMR sensors using only two layers of ferromagnetic material (e.g., Ni—Fe) separated by a layer of non-magnetic material (e.g., copper) are generally referred to as spin valve (SV) sensors. In an SV sensor, one of the ferromagnetic layers, referred to as the pinned layer (reference layer), has its magnetization typically pinned by exchange coupling with an antiferromagnetic (e.g., NiO or Fe—Mn) layer. The pinning field generated by the antiferromagnetic layer should be greater than demagnetizing fields (about 200 Oe) at the operating temperature of the SV sensor (about 120° C.) to ensure that the magnetization direction of the pinned layer remains fixed during the application of external fields (e.g., fields from bits recorded on the disk). The magnetization of the other ferromagnetic layer, referred to as the free layer, however, is not fixed and is free to rotate in response to the field from the recorded magnetic medium (the signal field). U.S. Pat. No. 5,206,590 granted to Dieny et al., incorporated herein by reference, discloses a SV sensor operating on the basis of the GMR effect.

An exemplary high performance read head employs a spin valve sensor for sensing the magnetic signal fields from the rotating magnetic disk. FIG. 1A shows a prior art SV sensor 100 comprising a free layer (free ferromagnetic layer) 110 separated from a pinned layer (pinned ferromagnetic layer) 120 by a non-magnetic, electrically-conducting spacer layer 115. The magnetization of the pinned layer 120 is fixed by an antiferromagnetic (AFM) layer 130.

FIG. 1B shows another prior art SV sensor 150 with a flux keepered configuration. The SV sensor 150 is substantially identical to the SV sensor 100 shown in FIG. 1A except for the addition of a keeper layer 152 formed of ferromagnetic material separated from the free layer 110 by a non-magnetic spacer layer 154. The keeper layer 152 provides a flux closure path for the magnetic field from the pinned layer 120 resulting in reduced magnetostatic interaction of the pinned layer 120 with the free layer 110. U.S. Pat. No. 5,508,867 granted to Cain et al., incorporated herein by reference, discloses a SV sensor having a flux keepered configuration.

Another type of SV sensor is an antiparallel (AP)-pinned SV sensor. In AP-Pinned SV sensors, the pinned layer is a laminated structure of two ferromagnetic layers separated by a non-magnetic coupling layer such that the magnetizations of the two ferromagnetic layers are strongly coupled together antiferromagnetically in an antiparallel orientation. The AP-Pinned SV sensor provides improved exchange coupling of the antiferromagnetic (AFM) layer to the laminated pinned layer structure than is achieved with the pinned layer structure of the SV sensor of FIG. 1A. This improved exchange coupling increases the stability of the AP-Pinned SV sensor at high temperatures which allows the use of corrosion resistant antiferromagnetic materials such as NiO for the AFM layer.

Referring to FIG. 2A, an AP-Pinned SV sensor 200 comprises a free layer 210 separated from a laminated AP-pinned layer structure 220 by a nonmagnetic, electrically-conducting spacer layer 215. The magnetization of the laminated AP-pinned layer structure 220 is fixed by an AFM layer 230. The laminated AP-pinned layer structure 220 comprises a first ferromagnetic layer 226 and a second ferromagnetic layer 222 separated by an antiparallel coupling layer (APC) 224 of nonmagnetic material. The two ferromagnetic layers 226, 222 ($FM_1$ and $FM_2$) in the laminated AP-pinned layer structure 220 have their magnetization directions oriented antiparallel, as indicated by the arrows 227, 223 (arrows pointing out of and into the plane of the paper respectively).

Nano-oxides have been intensively studied to improve the performance of spin-valve sensors (SVs). However, so far there is almost no work on how the crystalline property of the oxide would affect the property of SVs.

Since the pioneer work of Kamiguchi et al. in 1999, a variety of oxides have been investigated; these include but are not limited to Al—O, Cr—O, NiFe—O, Cu—O, CoFe—O, Ta—O, NiFeCr—O, Nb—O. In general, it was found that magnetic oxide such as CoFe—O is the most suitable oxide to be inserted inside pinned layers, whereas oxides with larger bandgaps such as Al—O are more suitable for capping layers. When it is appropriately oxidized and at small thickness, CoFe—O has the high chance to be formed almost epitaxially on the CoFe layer. However, it is well known that Al—O, Ta—O, Cr—O, and Nb—O are amorphous. Therefore, it is of interest to know how the crystallinity of the capping layer will affect the performance of the spin-valve.

In order to continue to increase areal density, CIP GMR sensor sensitivity has to be increased. "CIP" means that the sensing current flows in a direction parallel to or "in" the plane of the layers forming the sensor. What is therefore needed is a way to enhance a MR signal in a SV structure. What is also needed is a corresponding new SV structure and materials that provide such an improved MR signal.

SUMMARY OF THE INVENTION

The inventors have found that having a low defect epitaxial interface between the free layer and an oxide cap layer can effectively increase specularity, i.e., spin-dependent scattering can be enhanced, which in turn creates an increase in GMR ratio. For instance, a layer of epitaxially grown ZnO on top of the free layer results in a GMR ratio that is enhanced more than 2% over similar structures having AlOx or TaO cap layers.

A magnetic head according to one embodiment includes a free layer and a layer of metal oxide substantially epitaxially formed relative to the free layer. Preferably, the layer of metal oxide is a crystalline structure, and is of ZnO.

To assist in epitaxial growth of the metal oxide layer, a layer of metal can be formed on the free layer, the layer of metal acting as a seed layer for epitaxial growth of the layer of metal oxide. For example, when the metal oxide is ZnO, the layer of metal is preferably Zn at a thickness of less than about 10 angstroms, ideally less than about 5 angstroms.

Preferred materials for the free layer are CoFe, NiFe, and combinations thereof. The inventors have found that epitaxial growth is best when the portion of the free layer nearest the layer of metal oxide comprises CoFe.

The layer of metal oxide can be formed by sputtering in the presence of oxygen and an inert substance. Preferably, a volumetric amount of oxygen added during sputtering is between about 3 and about 20 parts oxygen based on 100 parts total of oxygen plus inert substance. Ideally, a volumetric amount of oxygen added during sputtering is between about 5 and about 12 parts oxygen based on 100 parts total of oxygen and inert substance.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 4 is a partial view of the slider and a merged magnetic head.

FIG. 5 is a partial ABS view, not to scale, of the slider taken along plane 5-5 of FIG. 4 to show the read and write elements of the merged magnetic head.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1A:
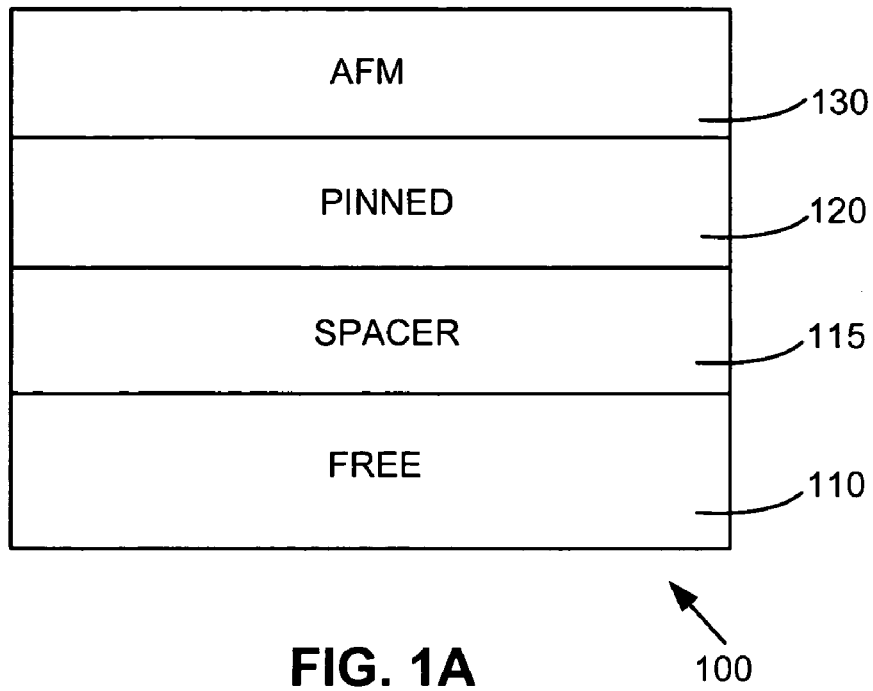
FIG. 1A is an air bearing surface view, not to scale, of a prior art spin valve (SV) sensor.
Figure 1B:
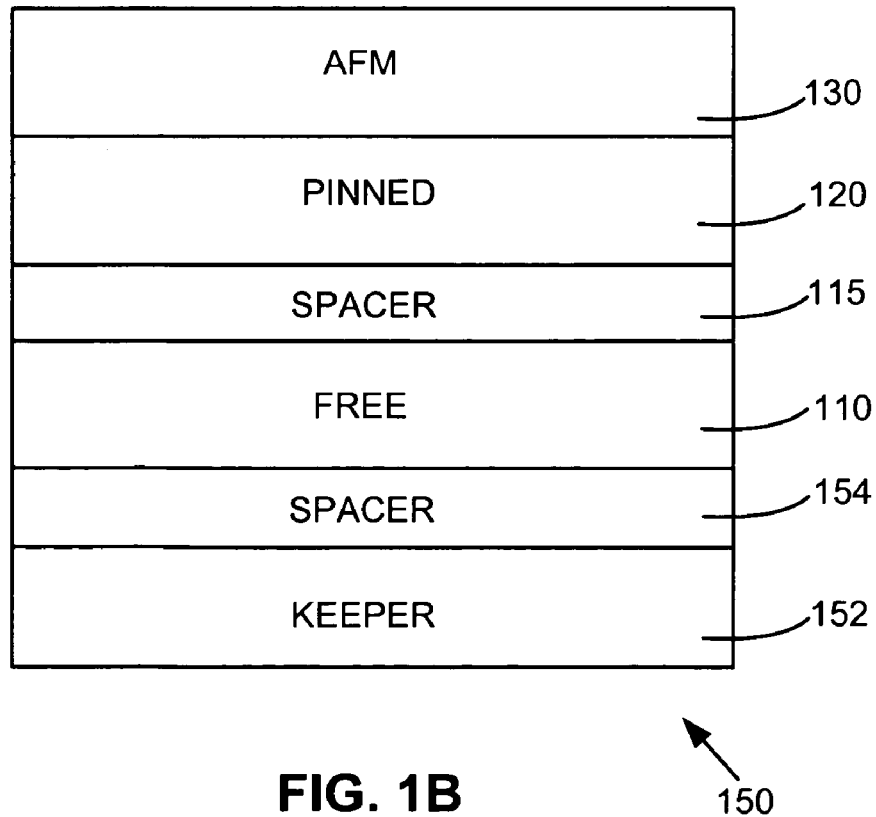
FIG. 1B is an air bearing surface view, not to scale, of a prior art keepered SV sensor.
Figure 2A:
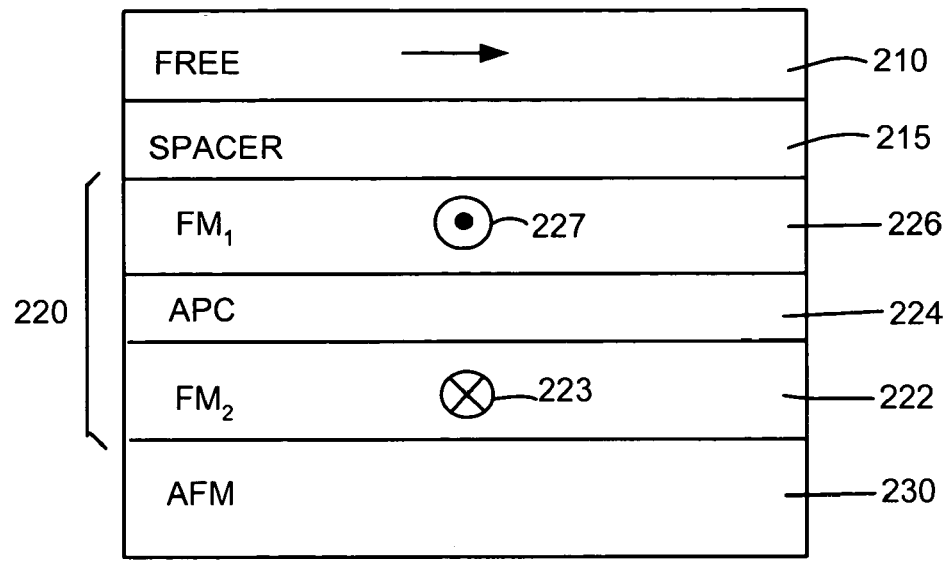
FIG. 2A is an air bearing surface view, not to scale, of a prior art AP-Pinned SV sensor.
Figure 2B:
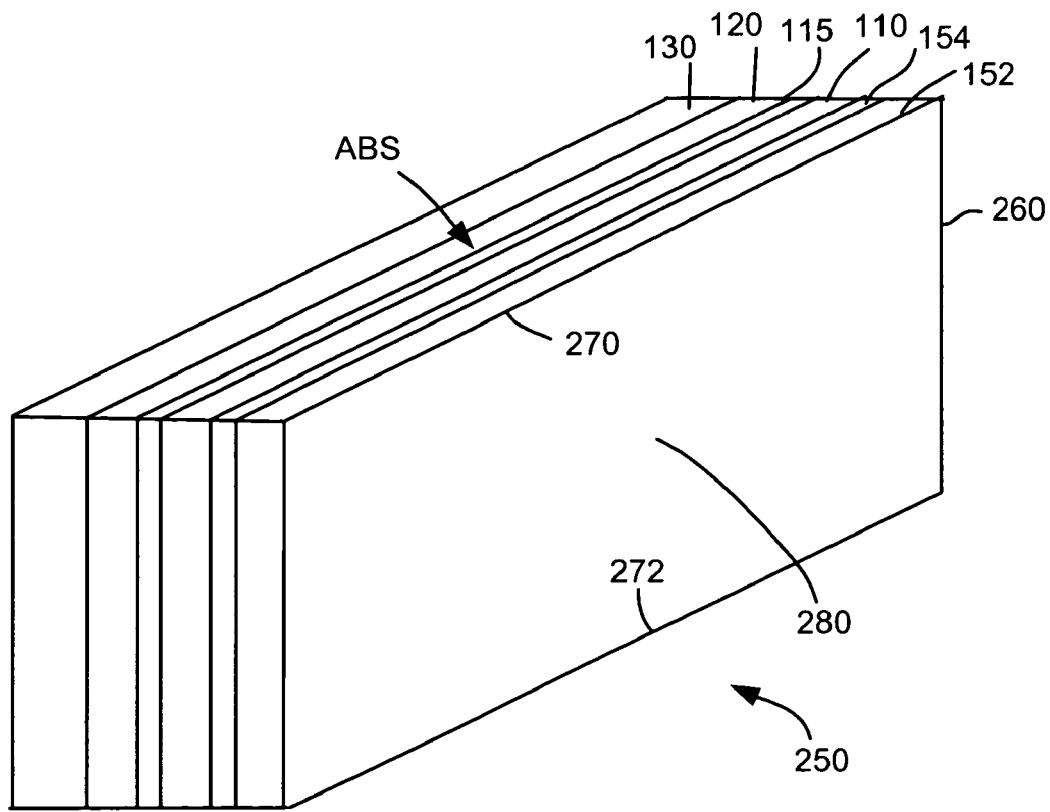
FIG. 2B is a perspective view, not to scale, of a prior art AP-Pinned SV sensor.
Figure 3:
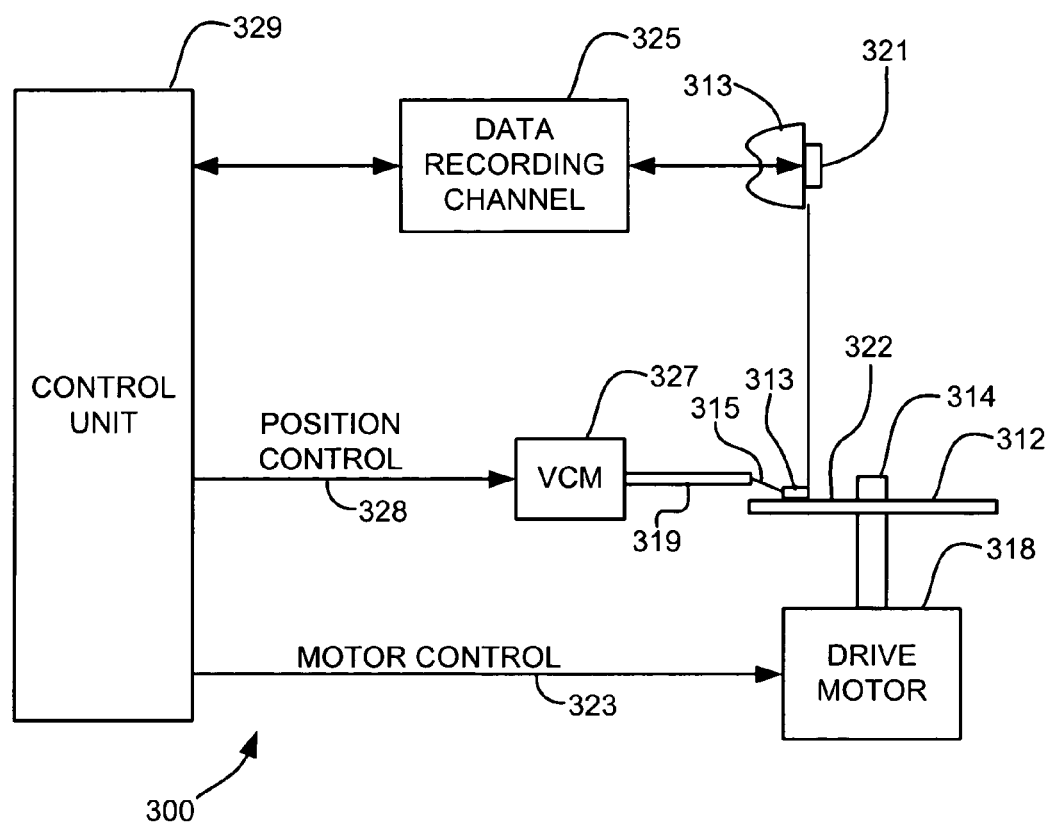
FIG. 3 is a simplified drawing of a magnetic recording disk drive system.

Referring now to FIG. 3, there is shown a disk drive 300 embodying the present invention. As shown in FIG. 3, at least one rotatable magnetic disk 312 is supported on a spindle 314 and rotated by a disk drive motor 318. The magnetic recording on each disk is in the form of an annular pattern of concentric data tracks (not shown) on the disk 312.

At least one slider 313 is positioned near the disk 312, each slider 313 supporting one or more magnetic read/write heads 321. More information regarding such heads 321 will be set forth hereinafter during reference to FIG. 4. As the disks rotate, slider 313 is moved radially in and out over disk surface 322 so that heads 321 may access different tracks of the disk where desired data are recorded. Each slider 313 is attached to an actuator arm 319 by means way of a suspension 315. The suspension 315 provides a slight spring force which biases slider 313 against the disk surface 322. Each actuator arm 319 is attached to an actuator means 327. The actuator means 327 as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 and disk surface 322 which exerts an upward force or lift on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage means and a microprocessor. The control unit 329 generates control signals to control various system operations such as drive motor control signals on line 323 and head position and seek control signals on line 328. The control signals on line 328 provide the desired current profiles to optimally move and position slider 313 to the desired data track on disk 312. Read and write signals are communicated to and from read/write heads 321 by way of recording channel 325.

The above description of a typical magnetic disk storage system, and the accompanying illustration of FIG. 3 are for representation purposes only. It should be apparent that disk storage systems may contain a large number of disks and actuators, and each actuator may support a number of sliders.

FIG. 4 is a side cross-sectional elevation view of a merged magnetic head 400, which includes a write head portion 402 and a read head portion 404, the read head portion employing a dual spin valve sensor 406 of the present invention. FIG. 5 is an ABS view of FIG. 4. The spin valve sensor 406 is sandwiched between nonmagnetic electrically insulative first and second read gap layers 408 and 410, and the read gap layers are sandwiched between ferromagnetic first and second shield layers 412 and 414. In response to external magnetic fields, the resistance of the spin valve sensor 406 changes. A sense current ($I_s$) conducted through the sensor causes these resistance changes to be manifested as potential changes. These potential changes are then processed as readback signals by the processing circuitry 329 shown in FIG. 3.

The write head portion 402 of the magnetic head 400 includes a coil layer 422 sandwiched between first and second insulation layers 416 and 418. A third insulation layer 420 may be employed for planarizing the head to eliminate ripples in the second insulation layer caused by the coil layer 422. The first, second and third insulation layers are referred to in the art as an "insulation stack". The coil layer 422 and the first, second and third insulation layers 416, 418 and 420 are sandwiched between first and second pole piece layers 424 and 426. The first and second pole piece layers 424 and 426 are magnetically coupled at a back gap 428 and have first and second pole tips 430 and 432 which are separated by a write gap layer 434 at the ABS. Since the second shield layer 414 and the first pole piece layer 424 are a common layer this head is known as a merged head. In a piggyback head an insulation layer is located between a second shield layer and a first pole piece layer. First and second solder connections (not shown) connect leads (not shown) from the spin valve sensor 406 to leads (not shown) on the slider 313 (FIG. 3), and third and fourth solder connections (not shown) connect leads (not shown) from the coil 422 to leads (not shown) on the suspension.

As mentioned above, in order to continue to increase areal density, CIP GMR sensor sensitivity has to be increased. Current AlOx and TaO cap layer (sputter deposition) provide a very small boost on GMR ratio, while the epitaxially grown ZnO on top of free layer results in a GMR ratio that can be enhanced more than 2%. ZnO is an n-type wide-bandgap semiconductor material. The inventors have also found that a larger magnetoresistance ratio and increase of the change of resistance can be realized in nano-oxide SVs by using epitaxially grown metal oxides, and particularly ZnO(0002), as a cap layer as compared to those SVs in which spin filter Cu/Ta or amorphous Al—O are used as the cap layer.

The ZnO may be formed by many processes, including plasma vapor (sputter) deposition, ion beam deposition, etc. Conventional processes understood by those skilled in the art are preferably used to perform most of the processing steps described below. Note also that the processing steps described herein are provided by way of example, and any suitable manner of adding/processing layers can be used to form the structures described herein.

To this end, the inventors have successfully grown ZnO (0002) epitaxially on CoFe(111) by magnetron sputtering at room temperature and employed it as capping layers for specular SVs. By epitaxial growth, what is meant is the growth on a crystalline substrate of a crystalline substance that mimics the crystalline orientation of the substrate. It was found that about a 2.4% increase of MR ratio is gained when ZnO (0002) is used as the cap layer as compared to the same structure using Al—O as the cap layer instead of ZnO.

While not wishing to be bound by any theory, the inventors believe that having a low defect epitaxial interface between the free layer and an oxide cap layer can effectively increase specularity, i.e., spin-dependent scattering can be enhanced, which reflects on the GMR ratio increase.

In one set of experiments, AP-pinned spin valves with a typical structure of Ta/NiFe/IrMn/CoFe/Ru/CoFe/NOL/CoFe/Cu/CoFe/CL (here, NOL stands for CoFe—O in most cases; and CL stands for cap layer, ZnO, Al—O or Cu/Ta) were grown on Si substrates coated with thermally oxidized 1 μm-thick $SiO_2$ using a magnetron sputtering method under ultra high vacuum with a base pressure of about $5 \times 10^{-10}$ Torr. ZnO was deposited by using a reactive sputtering method in a separated chamber at room temperature. Pulsed direct current (DC) was used to generate the plasma. The oxygen partial pressure is about $2.2 \times 10^{-4}$ Torr during deposition of ZnO. In order to avoid the oxidation in the free CoFe layer, one to two molecular layer of Zn was deposited before deposition of ZnO. After completion of the whole stack of the SV, the samples were magnetically annealed at 235° C. at 1 T for 2 hours. MR measurements were carried out by using a four-probe method in a vibrated sample magnetometer with MR measurement fixture. Cross-section TEM, X-ray diffraction, and X-ray photoelectron spectroscopy were used to characterize the structure of the thin films and the chemical state of the cap layer ZnO.

Figure 6A:
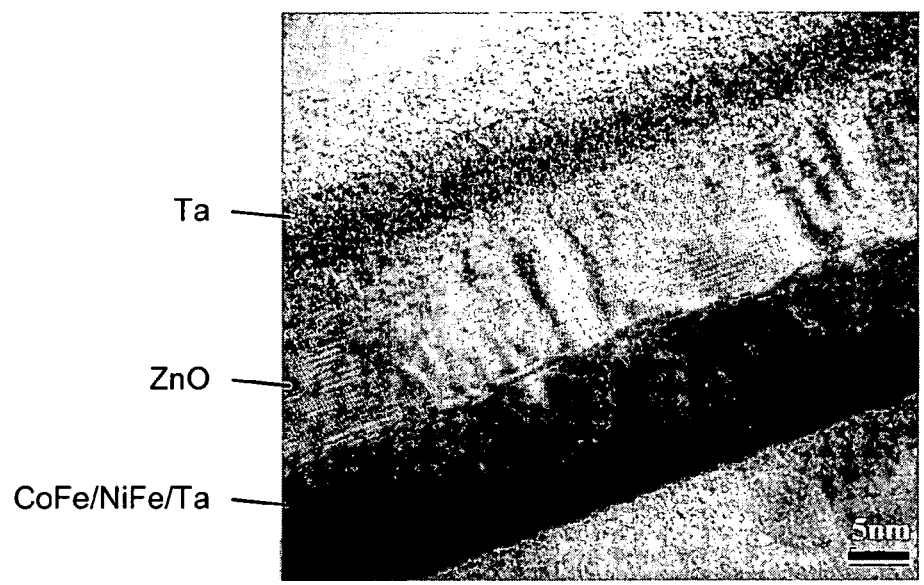
FIG. 6A is a cross sectional TEM picture of a thin film structure of Ta/NiFe/CoFe/ZnO/Ta.
Figure 6B:
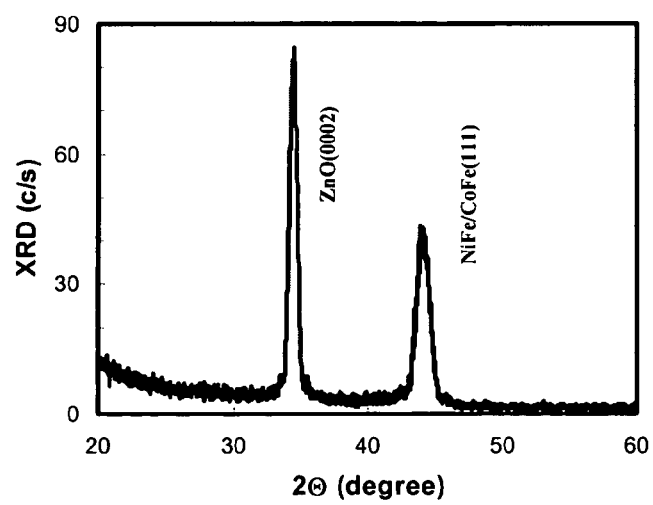
FIG. 6B is a chart illustrating x-ray diffraction (XRD) analysis of the structure shown in FIG. 6A.

FIG. 6A shows the cross-section TEM picture of a thin film with the structure of Ta5/NiFe2/CoFe6/ZnO15/Ta5, where the numeral following the material represents the thickness in Å (this convention is used throughout where structures are given). A 5-nm-thick Ta was used as the seed layer, and a 2-nm-thick NiFe was used as the structure guide layer. FIG. 6B is the XRD pattern of the structure of FIG. 6A in which 2θ is from 20° to 60°. There are two XRD peaks, one is at the 44.12° and the other is at 34.4°, which are corresponding to the NiFe/CoFe(111), and ZnO(0002), respectively. The lattice constant of ZnO is about 0.521 nm that is in good agreement with the atomic distance observed in FIG. 6A. The interface between CoFe and ZnO is very clear and sharp, indicating that there is no atomic diffusion between them. However, the interface between ZnO and Ta are quite blurred. This is probably due to chemical reaction between ZnO and Ta that results in the production of amorphous Ta—O or TaZn—O and pure Zn because of the larger affinity between Ta and O than that of Zn and O.

Figure 7:
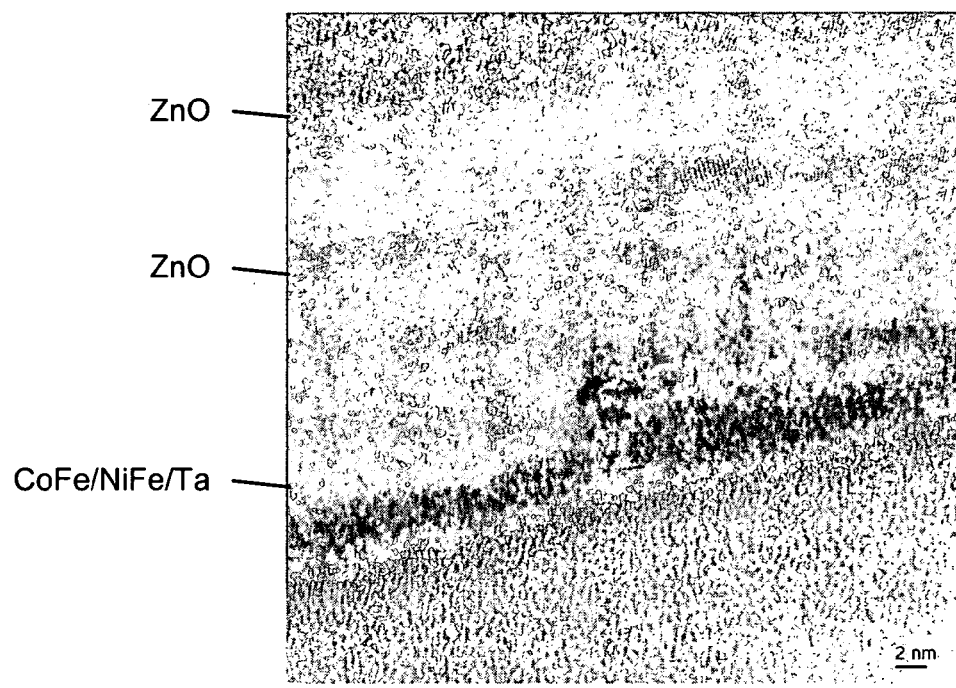
FIG. 7 is a cross sectional TEM picture of a spin valve with the structure of Ta/NiFe/IrMn/CoFe/Ru/CoFe/ZnO/CoFe/Cu/CoFe/ZnO.

FIG. 7 shows the cross-section TEM picture of a SV with the structure of Ta3/NiFe2/IrMn8/CoFe2/Ru0.8/CoFe1/ZnO1/CoFe2.3/Cu2.3/CoFe2.6/ZnO2.0. ZnO is crystalline no matter whether it is used as the cap layer or inside the pinned layer. We have found that the surface roughness of ZnO is quite large. Based on atomic force microscopy measurement, the root mean square is about 0.6 nm. XPS analysis shows that the chemical valence of Zn in the cap layer is two. A small Zn LMMM peak around 493 eV, which is corresponding to an Auger electron spectroscopy of pure Zn element was observed at the interface between CoFe and ZnO, indicating that the cap layer was still under oxidization. It also means that the free CoFe is free from oxidation.

Figure 8:
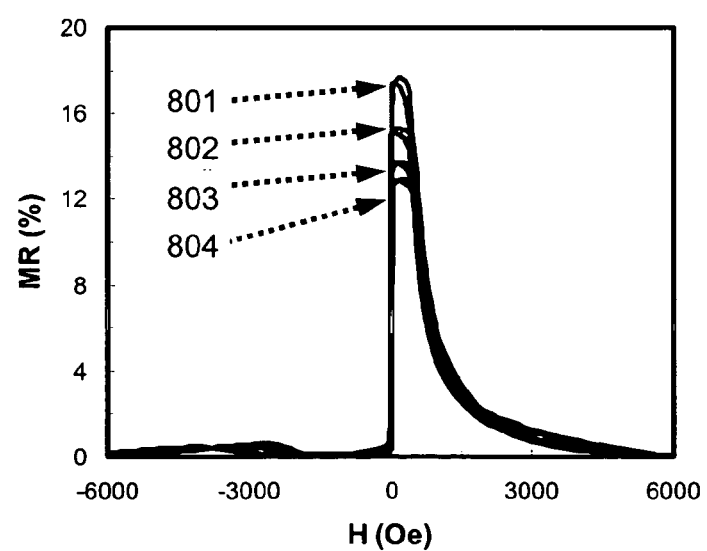
FIG. 8 is a chart showing MR-H curves for a series of SVs.

The MR-H curve of this sample and together with three other SVs are shown in FIG. 8. Particularly, FIG. 8 depicts MR-H curves for a series of SVs with the structure of Ta3/NiFe2/IrMn8/CoFe2/Ru0.8/CoFe1/NOL/CoFe2.3/Cu2.3/CoFe2.6/ZnO 1.3 (#1, corresponding to plot with peak 801), Ta3/NiFe2/IrMn8/CoFe2/Ru0.8/CoFe1/NOL/CoFe2.3/Cu2.3/CoFe2.6/AlO1 (#2, corresponding to plot with peak 802), Ta3/NiFe2/IrMn8/CoFe2/Ru0.8/CoFe1/NOL/CoFe2.3/Cu2.3/CoFe2.6/Cu1.1/Ta1 (#3, corresponding to plot with peak 803), and Ta3/NiFe2/IrMn8 /CoFe2/Ru0.8/CoFe1/ZnO1/CoFe2.3/Cu2.3/CoFe2.6/ZnO1.3 (#4, corresponding to plot with peak 804). The MR ratio is about 17.7% for a SV when CoFe—O is inserted inside the pinned layer and ZnO is used as the cap layer. It is about 13% when ZnO is inserted inside the pinned layer while the ZnO is used as the cap layer. The exchange coupling field between the free layer and the pinned layer is almost the same whether ZnO or CoFe—O is inside the pinned layer. The reason why 1-nm thick ZnO inside the pinned layer still does not deteriorate the exchange coupling between the free layer and the pinned layer is believed to be due to the roughness of the ZnO layer, which favors the strong coupling between two parts of the CoFe in the pinned layer. However, it is not clear why ZnO inside the pinned layer has not been shown to boost MR. By comparison, the MR-H curves for SVs with the same structure but with Cu1.1/Ta1 and AlO1 used as the cap layer are also plotted in FIG. 8. The overall properties such as the interlayer coupling field ($H_{int}$), coercivity of the free layer ($H_c$), exchange coupling field ($H_{ex}$), MR ratio, and the change of the resistance are listed in Table 1 (below). MR increases in a sequence of the cap layer from Cu/Ta, to AlO and to ZnO. The coercivity of the free layer (along easy-axis) is in the magnitude order of 10 Oe. However, when ZnO is inserted inside of the pinned CoFe layer, the coercivity of the free layer is larger. This is probably due to the change of the microstructure of the free layer. With ZnO inside the pinned layer, the MR ratio decreases as compared to other cases.

TABLE 1

Overall performance of SVs with the structure of
Ta/NiFe/IrMn/CoFe/Ru/CoFe/NOL/CoFe/Cu/CoFe/CL.
NOL = CoFe—O and CL = ZnO for
1, NOL = CoFe—O and CL = AlO for #2, NOL = CoFeO and
CL = Cu/Ta for #3, NOL = ZnO
and CL = ZnO for #4.

| Sample ID | $H_{int}$ (Oe) | $H_C$ (Oe) | MR (%) | $\Delta R$ ($\Omega$) | $H_{ex}$ (Oe) |
|---|---|---|---|---|---|
| #1 | 14.8 | 11.0 | 17.7 | 0.712 | 750 |
| #2 | 11.1 | 13.9 | 15.3 | 0.678 | 770 |
| #3 | 6.2 | 9.4 | 13.7 | 0.556 | 745 |
| #4 | 9.5 | 21.9 | 13.0 | 0.553 | 780 |

Figure 9A:
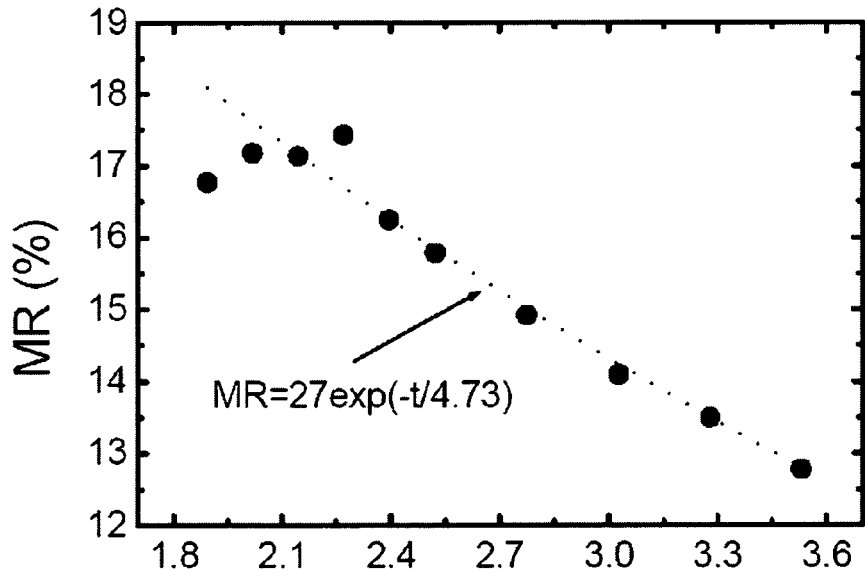
FIG. 9A is a chart illustrating an MR ratio as a function of the thickness of the spacer layer for SVs with the structure of Ta/NiFe/IrMn/CoFe/Ru/CoFe/NOL/CoFe/Cu(t)/CoFe/ZnO.
Figure 9B:
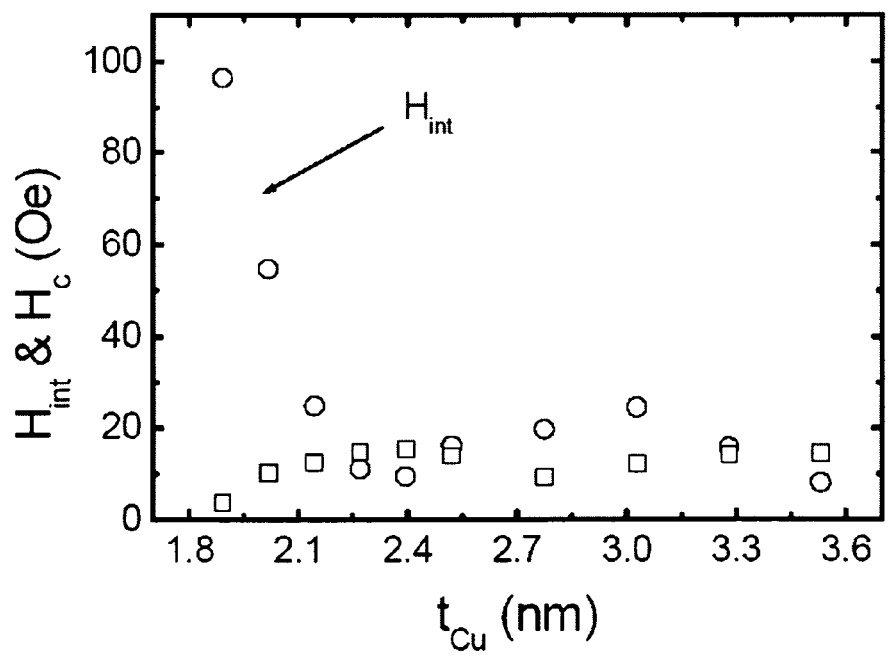
FIG. 9B is a chart illustrating $H_{int}$ and $H_c$ as a function of the thickness of the spacer layer for SVs with the structure of Ta/NiFe/IrMn/CoFe/Ru/CoFe/NOL/CoFe/Cu(t)/CoFe/ZnO.

FIGS. 9A-B show MR, and $H_{int}$ and $H_c$, respectively, as a function of the thickness of the spacer layer for a series of SVs with the structure of Ta3/NiFe2/IrMn8/CoFe2/Ru0.8/CoFe1/NOL/CoFe2.3/Cu(t)/CoFe2.6/ZnO1.3. Maximum MR appears at 2.27-nm-thick of the Cu layer. When the thickness of the spacer layer is larger than 2.5 nm, MR ratio can be approximately fitted by using an exponential function MR=$M_o$ exp ($-t/t_o$), here $MR_o$ is about 27% and $t_o$ is about 4.75 nm, which reflects the spin dependent scattering length in the Cu layer. The non exponential part below the thickness of the spacer layer 2.5 nm is associated to the enhancement of the ferromagnetic interlayer coupling between the free layer and the pinned layer. The MR ratio is well correlated to the interlayer coupling field which is plotted in the FIG. 9B. As observed in many other cases, the interlayer coupling field oscillates with the thickness of the spacer layer. Accompanied with the oscillation of the interlayer coupling, the coercivity of the free layer oscillates with the thickness of the spacer layer as well.

Figure 9C:
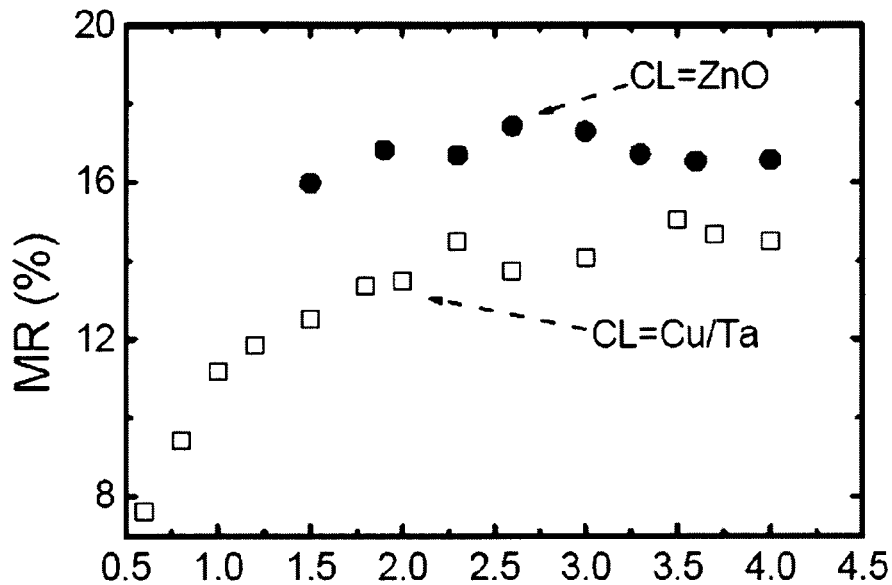
FIG. 9C is a chart illustrating an MR ratio as a function of the thickness of the free layer for SVs with the structure of Ta/NiFe/IrMn/CoFe/Ru/CoFe/NOL/CoFe/Cu/CoFe(t)/CL where CL=ZnO, and Cu/Ta, respectively.
Figure 9D:
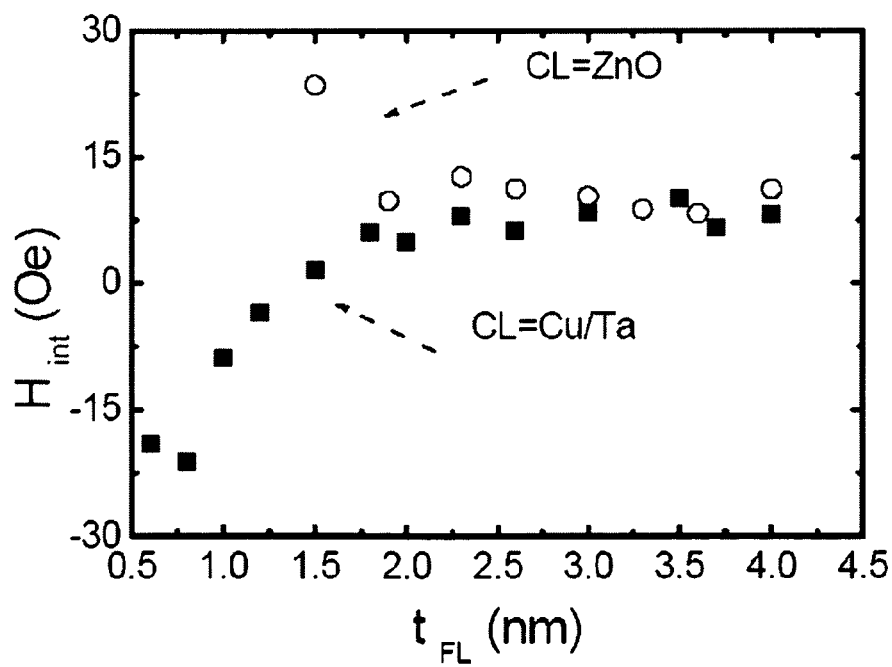
FIG. 9D is a chart illustrating $H_{int}$ as a function of the thickness of the free layer for SVs with the structure of Ta/NiFe/IrMn/CoFe/Ru/CoFe/NOL/CoFe/Cu/CoFe(t)/CL where CL=ZnO, and Cu/Ta, respectively.

FIG. 9C shows MR as a function of the thickness of the free layer for SVs with the structure of Ta3/NiFe2/IrMn8/CoFe2/Ru0.8/CoFe1/NOL/CoFe2.3/Cu2.3/CoFe(t)/CL for CL=Cu1.1/Ta1, and, ZnO1.3, respectively. MR ratio in SVs with CL=ZnO is larger than that of SVs with CL=Cu/Ta in the whole thickness range from 1 nm to 4 nm. There is one MR peak when ZnO is used as the CL. However, when Cu/Ta is used as the CL, there are two MR peaks, appear at 2.6 nm, and 3.6 nm, respectively. FIG. 9D shows the interlayer coupling field as a function of the thickness of the free layer. $H_{int}$ shows oscillation with the thickness of the free layer too. For CL=Cu/Ta, when the thickness of the free layer is smaller than 1.2 nm, $H_{int}$ has a negative value, indicating that the remnant state is an antiferromagnetic state. When the thickness of the free layer is further decreased, the value of $H_{int}$ increases. $H_{int}$ can reach −20 Oe when the thickness of the free layer is about 0.8 nm. The strong antiferromagnetic coupling between the free and pinned layers is attributed to the amplified RKKY interaction due to enhancement of the specular reflectivity of electrons at the interface between NOL and the ferromagnetic layer. When ZnO is used as the CL, there is a small concavity at 1.8 nm. The difference of the concave position in SVs with the same structure but different cap layers shows that the magnetic interaction between the free layer and the pinned layer is not only determined by the spacer layer and the magnetic layer, but also modified by physical properties of the cap layer.

The inventors have found that a thin seed layer of Zn aids in the epitaxial growth of the ZnO layer.

EXAMPLES

As mentioned above, the inventors have surprisingly found that a very thin cap layer of ZnO enhances GMR. The following Examples illustrate the effects of varying structural and/or processing parameters.

Example 1

Example 1 illustrates the signal variations that occur upon varying the thickness (d) of a Zn seed layer for the given head structure of a current into plane (CIP) head. As shown in Example 1, the GMR signal enhancement is somewhat dependent upon the thickness of the Zn seed layer. For the particular structure listed, a Zn thickness of 2 Å provides the highest signal. As the thickness of the Zn layer increased, the signal is degraded.

To create the structure of Example 1, a Zn seed layer is formed by sputter deposition. ZnO is then deposited from a metallic zinc target in the presence of oxygen. During deposition, an energized inert substance, preferably Ar ions, is used to bombard the Zn target. Oxygen also bombards the target so that ZnO is formed on the head structure. The ratio of Ar to oxygen is important. In Example 1, the ZnO is deposited at a rate of about 0.4-0.6 Å per second with 3.5 standard cubic centimeters per minute (sccm) $O_2$ plus 46.5 sccm Ar (total 50 sccm) being introduced to the system. Thus, oxygen comprises about 7% of the total oxygen and Ar collectively added to the system. Preferably, the percentage of oxygen relative to the total oxygen and Ar added to the system is between about 3% and about 20%, more preferably between about 5% and about 12%. These flow rates are provided as one preferred implementation and one skilled in the art will understand that the flow rates of $O_2$ and Ar during ZnO deposition will vary depending on the particular processing conditions being used, and on the desired deposition rate of the metallic Zn itself. A measure that can be used to determine the ratio of $O_2$ to Ar added to the system is based on the conductivity of the ZnO. For example, the conductivity of the ZnO can be measured during the process, and the flow rates of $O_2$ and Ar adjusted to maintain a conductivity below a predetermined level, such as $<5 \times 10^{-7}$ $(Ohm \cdot cm)^{-1}$ (or resistivity of $>2 \times 10^6$ $Ohm \cdot cm$). As the oxygen content of the material deposited descreases, i.e., more metallic zinc is deposited along with the ZnO, the conductivity of the deposited material increases. Thus, the designer can determine the conductivity of the material deposited that provides the optimum signal enhancement and adjust the flow rates of the $O_2$ and Ar provide that material.

1) NiFeCr40/NiFe7/PtMn150/CoFe15//Ru8/CoFe14/Cu21/CoFe17/Znd/ZnO30* (thickness in Angstroms)

| d (thickness of Zn seed in angstroms) | DR/R |
|---|---|
| 2 | 15.66 |
| 5 | 10.13 |
| 7 | 11.74 |
| 9 | 13.06 |
| 11 | 11.25 |
| Ref. 1 | 11.14 |
| Ref. 2 | 11.08 |

Ref. 1) Replacing Zn/ZnO with $O_2$ exposure and Ta 30 cap
Ref. 2) Replacing Zn/ZnO with Ru5/Ta30 cap
*ZnO deposited with 3.5 sccm $O_2$ plus 46.5 sccm Ar, Zn deposition rate of 0.4-0.6 Å/sec.

Refs. 1 and 2 are provided to illustrate the signal achieved when standard cap materials are used instead of the Zn/ZnO layer.

Example 2

Example 2 illustrates the signal variations through the recited structures that are achieved by varying the flow rate (x) of oxygen into the system during deposition of the ZnO layer. Note that the total flow rate of the oxygen plus argon in this example is 50 sccm. In other words, when the flow rate of oxygen is 5 sccm, the flow rate of Ar is 45 sccm; when the flow rate of oxygen is 3.5 sccm, the flow rate of Ar is 46.5 sccm; and so on. Again, the optimum percentage of oxygen to the total oxygen plus Ar added to the system is about 7% in this case.

While not wishing to be bound by any theory, the inventors believe that addition of too little oxygen will result in too much metallic Zn being deposited with the ZnO, resulting in a higher conductivity of the deposited material. If too much oxygen is added to the system, the inventors believe that the Zn seed layer may become oxidized, adversely affecting the epitaxial effect, which in turn degrades the signal.

2) NiFeCr40/NiFe7/PtMn150/CoFe15/Ru8/CoFe14/Cu21/CoFe17/Zn2/ZnOx30

| x (sccm O2) | DR/R |
|---|---|
| 5 | 14.8 |
| 3.5 | 15.34 |
| 2.5 | 11.48 |
| 1.7 | 11.23 |
| Ref. 1 | 8.43 |
| Ref. 2 | 11.26 |
| Ref. 3 | 11.3 |

Ref. 1) replacing Zn/ZnOx cap with Cu3/TaOx30
Ref. 2) replacing Zn/ZnOx cap with Cu3/Ta30

Ref. 3) replacing Zn/ZnOx cap with $o_2$ exposure and Ta30 cap

Refs. 1-3 are provided to illustrate the signal achieved when standard cap materials are used instead of the Zn/ZnO layer.

Example 3

Example 3 illustrates the effect of varying the thickness (d) of the Zn seed layer in a structure having a multi-layer free layer comprising CoFe and NiFe. In a typical free layer, a layer of NiFe is formed on top of CoFe. Thus, a typical head has the following structure: seed layers/AFM layer/AP pinned layer structure/spacer/free layer (CoFe/NiFe bilayer)/Ta cap. The inventors have found that the best performance is obtained by forming a Zn seed layer on top of CoFe, followed by a ZnO cap. However, it is possible to add the Zn on NiFe free layer. The following structure includes a layer of NiFe between two layers of CoFe to achieve optimum conditions for epitaxial growth while maximizing the effectiveness of the free layer as a whole.

3) NiFeCr40/NiFe7/PtMn150/CoFe15/Ru8/CoFe14/Cu21/CoFe5.5/NiFe9/CoFe5.5/Znd/ZnO30*

| d (Å) | DR/R |
|---|---|
| 2 | 14.2 |
| 2.5 | 13.16 |
| 3 | 11.2 |
| 3.5 | 10.56 |
| Ref. 1 | 13.65 |
| Ref. 2 | 11.93 |
| Ref. 3 | 12.2 |

Ref. 1) replacing Zn/ZnO cap with Cu5/TaOx30 cap
Ref. 2) replacing Zn/ZnO cap with $O_2$ exposure and Ta30 cap
Ref. 3) replacing Zn/ZnO cap with Cu5/Ta30 cap
*ZnOx deposited with 3.5 sccm $O_2$ and 46.5 sccm Ar Refs. 1-3 are provided to illustrate the signal achieved when standard cap materials are used instead of the Zn/ZnO layer.

Example 4

Example 4 illustrates the effect of varying a thickness (d) of an NiFe layer of a multi-layer with various cap materials.

4) NiFeCr40/NiFe7/PtMn150/CoFe15/Ru8/CoFe14/Cu21/CoFe11/NiFed/CoFe5.5/cap

| d (Å) | DR/R | tF (A) | Cap |
|---|---|---|---|
| 6 | 14.87 | 39.2 | Zn2/ZnO30* |
| 4.5 | 14.85 | 38.7 | Zn2/ZnO30* |
| 3 | 14.02 | 32.8 | Zn2/ZnO30* |
| 1.5 | 15.29 | 33.3 | Zn2/ZnO30* |
| 2.2 | 13.86 | 32.94 | Zn2/ZnO30* |
| 4.5 | 13.86 | 38.96 | Zn2/ZnO30* |
| 6.7 | 13.5 | 39.85 | Zn2/ZnO30* |
| 9 | 14.01 | 45.34 | Zn2/ZnO30* |
| 15** | 12.98 | 37.9 | O2/Ta30 |
| 6 | 12.29 | 27.9 | O2/Ta30 |
| 9 | 11.93 | 29 | O2/Ta30 |

*ZnO deposited with 46.5 sccm Ar and 3.5 sccm $O_2$
**No 2nd CoFe in free layer

In summary, ZnO has been successfully grown on CoFe. Both MR and the change of MR can be enhanced in nano-oxide synthetic SVs when ZnO is used as the cap layer. Enhancement of the MR in SVs with ZnO used as the cap layer is believed to be due to epitaxial growth of ZnO on CoFe and its sharp interface between CoFe and ZnO so that the specular reflectivity is increased. In this sense, epitaxial growth of ZnO on CoFe offers a good approach to creating enhanced spintronic devices.

While various embodiments have been described above, it should be understood that they have been presented by way of example only, and not limitation. For example, the structures and methodologies presented herein are generic in their application to all electronic devices. Thus, the breadth and scope of a preferred embodiment should not be limited by any of the above-described exemplary embodiments, but should be defined only in accordance with the following claims and their equivalents.

What is claimed is:

1. A magnetic head, comprising:
a free layer comprising two layers of CoFe separated by a layer of NiFe;
a substantially unoxidized Zn(0002) seed layer formed directly on the free layer, wherein the seed layer has a thickness of less than about 3.5 angstroms; and
a layer of metal oxide formed directly on the seed layer and forming an interface therewith such that the interface defines a sharp transition from a metal forming the seed layer and the metal oxide forming the oxide layer, the layer of metal oxide being substantially epitaxially formed relative to a crystalline structure of the free layer, wherein the metallic component of the seed layer and the metallic component of the layer of metal oxide are based on the same metal, wherein the metal oxide layer is ZnO.

2. A magnetic head as recited in claim 1, wherein the seed layer has a thickness of about 1 to 2 molecules.

3. A magnetic head as recited in claim 1, wherein the layer of ZnO has an electrical conductivity below $5\times10^{-7}(Ohm\cdot cm)^{-1}$.

4. A magnetic head as recited in claim 1, further comprising a pinned layer and an oxygen-containing layer between the pinned layer and the free layer.

5. A magnetic head as recited in claim 1, wherein the seed layer has a thickness of 1 molecule.

6. A magnetic head as recited in claim 1, wherein the layer of Zn has a thickness of about 2 angstroms or less.

7. A magnetic head as recited in claim 1, wherein the CoFe of the free layer is CoFe (111).

8. A magnetic head as recited in claim 1, wherein a portion of the free layer nearest the layer of metal oxide comprises the CoFe(111).

9. A magnetic head as recited in claim 1, wherein the layer of metal oxide is formed by sputtering in the presence of oxygen and an inert substance.

10. A magnetic head as recited in claim 9, wherein a volumetric amount of oxygen added during sputtering is between about 3 and about 20 parts oxygen based on 100 parts total of oxygen plus inert substance, wherein the amount of oxygen added during sputtering is selected to avoid oxidizing the seed layer during the sputtering.

11. A magnetic head as recited in claim 9, wherein a volumetric amount of oxygen added during sputtering is between about 5 and about 12 parts oxygen based on 100 parts total of oxygen and inert substance.

12. A magnetic head as recited in claim 9, wherein the seed layer has a thickness of 1 molecule.

13. A magnetic storage system, comprising:
magnetic media;
at least one head for reading from and writing to the magnetic media, each head having:
a sensor having the structure recited in claim 1;
a write element coupled to the sensor
a slider for supporting the head; and
a control unit coupled to the head for controlling operation of the head.

14. A magnetic head, comprising:
a pinned layer;
a free layer comprising two layers of CoFe separated by a layer of NiFe;
an oxygen-containing layer between the pinned layer and the free layer;
a seed layer of Zn having a thickness of less than about 3.5 angstroms, the seed layer being formed directly on the free layer; and
a layer of ZnO formed directly on the seed layer and being substantially epitaxially formed relative to a crystalline structure of the free layer wherein a DR/R of the head is at least 13.5.

15. A magnetic head as recited in claim 14, wherein the layer of Zn has a thickness of less than about 3 angstroms.

16. A magnetic head as recited in claim 15, wherein the layer of Zn has a thickness of less than about 2 angstroms.

17. A magnetic head as recited in claim 14, wherein the seed layer has a thickness of 1 molecule.

18. A magnetic head as recited in claim 14, wherein a portion of the free layer nearest the layer of ZnO comprises CoFe.

19. A magnetic head as recited in claim 14, wherein the layer of ZnO is formed by sputtering in the presence of oxygen and an inert substance.

20. A magnetic head as recited in claim 19, wherein a volumetric amount of oxygen added during sputtering is between about 3 and about 20 parts oxygen based on 100 parts total of oxygen plus inert substance.

21. A magnetic bead as recited in claim 19, wherein a volumetric amount of oxygen added during sputtering is between about 5 and about 12 parts oxygen based on 100 parts total of oxygen plus inert substance.

22. A magnetic head as recited in claim 19, wherein a volumetric amount of oxygen added during sputtering is selected based on a conductivity of the ZnO during sputtering.

23. A magnetic storage system, comprising:
magnetic media;
at least one head for reading from and writing to the magnetic media, each head having:
a sensor having the structure recited in claim 14;
a write element coupled to the sensor;

a slider for supporting the head; and a control unit coupled to the head for controlling operation of the head.

24. A method for forming a magnetic head, comprising:
forming a free layer positioned above the pinning layer;
forming a seed layer of Zn directly on the free layer, the seed layer having a thickness of less than about 3.5 angstroms; and
forming a layer of ZnO directly on the seed layer by sputtering in the presence of oxygen and an inert substance, wherein the layer of ZnO is substantially epitaxially formed relative to the free layer, wherein a DR/R of the head is a least 13.5.

25. A method as recited in claim 24, wherein a volumetric amount of oxygen added during sputtering is between about 3 and about 20 parts oxygen based on 100 parts total of oxygen plus inert substance.

26. A method as recited in claim 24, wherein a volumetric amount of oxygen added during sputtering is between about 5 and about 12 parts oxygen based on 100 parts total of oxygen plus inert substance.

27. A method as recited in claim 24, wherein a volumetric amount of oxygen added during sputtering is selected based on a conductivity of the ZnO during sputtering.

* * * * *

UNITED STATES PATENT AND TRADEMARK OFFICE
CERTIFICATE OF CORRECTION

| | | |
|---|---|---|
| PATENT NO. | : 7,446,985 B2 | Page 1 of 1 |
| APPLICATION NO. | : 10/741436 | |
| DATED | : November 4, 2008 | |
| INVENTOR(S) | : Lee et al. | |

It is certified that error appears in the above-identified patent and that said Letters Patent is hereby corrected as shown below:

column 9, line 15 "descreases" should read --decreases--.

Signed and Sealed this

Fourteenth Day of July, 2009

JOHN DOLL
*Acting Director of the United States Patent and Trademark Office*